US010843508B2

(12) United States Patent
Colvin et al.

(10) Patent No.: US 10,843,508 B2
(45) Date of Patent: *Nov. 24, 2020

(54) GUAYULE TIRE TREAD COMPOUND

(71) Applicant: Cooper Tire & Rubber Company, Findlay, OH (US)

(72) Inventors: Howard Colvin, Wayne, OH (US); Zachary Walters, Findlay, OH (US)

(73) Assignee: COOPER TIRE & RUBBER COMPANY, Findlay, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/895,532

(22) Filed: Feb. 13, 2018

(65) Prior Publication Data

US 2018/0229552 A1 Aug. 16, 2018

Related U.S. Application Data

(60) Provisional application No. 62/458,293, filed on Feb. 13, 2017.

(51) Int. Cl.
| | | |
|---|---|---|
| *B60C 1/00* | (2006.01) | |
| *C08K 5/01* | (2006.01) | |
| *C08L 7/00* | (2006.01) | |
| *C08K 3/36* | (2006.01) | |
| *C08L 15/00* | (2006.01) | |

(52) U.S. Cl.
CPC ............. *B60C 1/0016* (2013.01); *C08K 3/36* (2013.01); *C08K 5/01* (2013.01); *C08L 7/00* (2013.01); *C08L 15/00* (2013.01)

(58) Field of Classification Search
CPC . B60C 1/0016; C08K 5/01; C08L 7/00; C08L 15/00
See application file for complete search history.

(56) References Cited

U.S. PATENT DOCUMENTS

| | | | |
|---|---|---|---|
| 3,742,093 | A | 6/1973 | Skidmore |
| 4,110,843 | A | 8/1978 | Skidmore |
| 5,580,942 | A | 12/1996 | Cornish |
| 6,135,180 | A | 10/2000 | Nohara |
| 7,084,228 | B2 | 8/2006 | Labauze et al. |
| 7,253,225 | B2 | 8/2007 | Labauze et al. |
| 7,737,209 | B2 | 6/2010 | Miyazaki |
| 7,795,356 | B2 | 9/2010 | Mihara et al. |
| 7,989,550 | B2 | 8/2011 | Amino et al. |
| 8,100,157 | B2 | 1/2012 | Hattori et al. |
| 8,124,692 | B2 | 2/2012 | Miyazaki |
| 8,815,995 | B2 | 8/2014 | Vest et al. |
| 8,871,832 | B2 | 10/2014 | Takizawa |
| 8,981,006 | B2 | 3/2015 | Yagi et al. |
| 9,034,980 | B2 | 5/2015 | Recker et al. |
| 9,108,464 | B2 | 8/2015 | Recker et al. |
| 9,139,721 | B2 | 9/2015 | Sugiura |
| 9,211,769 | B2 | 12/2015 | Amamoto et al. |
| 2004/0092644 | A1 | 5/2004 | Labauze |
| 2004/0122157 | A1 | 6/2004 | Labauze |
| 2005/0148713 | A1 | 7/2005 | Labauze et al. |
| 2010/0317800 | A1 | 12/2010 | Pille-Wolf et al. |
| 2011/0104378 | A1 | 5/2011 | Willimann et al. |
| 2012/0031537 | A1 | 2/2012 | Izuchi |
| 2013/0158185 | A1 | 6/2013 | Thompson |
| 2013/0184397 | A1* | 7/2013 | Blok ........................ B60C 1/00 524/518 |
| 2013/0253088 | A1 | 9/2013 | Agarwal |
| 2013/0274404 | A1 | 10/2013 | Vasseur et al. |
| 2014/0069560 | A1 | 3/2014 | Schweitzer et al. |
| 2014/0107261 | A1 | 4/2014 | Miyazaki |
| 2014/0235751 | A1 | 8/2014 | Lesage et al. |
| 2015/0065627 | A1 | 3/2015 | Jagst et al. |
| 2015/0065655 | A1 | 3/2015 | Blok et al. |

(Continued)

FOREIGN PATENT DOCUMENTS

| | | | |
|---|---|---|---|
| EP | 1652878 | A1 | 5/2006 |
| EP | 3075773 | A1 | 10/2016 |

(Continued)

OTHER PUBLICATIONS

Jonathan E. Martens et al., Akron Rubber Development Laboratory, "Effect of Deformation Mode in Prediction of Tire Performance by Dynamic Mechanical Analysis", Rubber World, pp. 29-41, Sep. 2013.

Russell J. Nichols, et al. "Direct Extrusion of Polymer Latex Emulsions", Advances in Polymer Technology, vol. 3, No. 1, Welding Engineers, Inc., King of Prussia, PA.

Shingo Futamura, "Analysis of Ice and Snow Traction of Tread Material", vol. 64, pp. 648-653,The Goodyear Tire & Rubber Company, Technical Center, Akron, OH, Jan. 2, 1996.

(Continued)

*Primary Examiner* — Irina S Zemel
*Assistant Examiner* — Jeffrey S Lenihan
(74) *Attorney, Agent, or Firm* — Jacob M. Ward; Ward Law Office LLC

(57) ABSTRACT

A tire tread composition includes a quantity of an elastomer including guayule natural rubber, and a quantity of a hydrocarbon resin substantially evenly distributed throughout the elastomer. The elastomer of the tire tread composition may consist entirely of guayule natural rubber. The hydrocarbon resin may be selected to have a predetermined miscibility in the guayule natural rubber. The predetermined miscibility is measured by a deviation of actual Tg from predicted Tg for either the tire tread composition or an elastomer-resin mixture consistent with the elastomer and resin used in the tire tread composition. In particular, the predetermined miscibility in the guayule natural rubber is less than about six percent (6%) deviation in the actual Tg from the predicted Tg at a 20 phr loading.

13 Claims, 10 Drawing Sheets

(56) References Cited

U.S. PATENT DOCUMENTS

| | | |
|---|---|---|
| 2015/0283854 A1 | 10/2015 | Saintigny et al. |
| 2015/0361252 A1 | 12/2015 | Mabuchi |
| 2016/0339744 A1 | 11/2016 | Boley et al. |
| 2018/0229552 A1 | 8/2018 | Colvin et al. |

FOREIGN PATENT DOCUMENTS

| | | | |
|---|---|---|---|
| WO | WO-2015077800 A1 * | 5/2015 | |
| WO | WO-2016098908 A1 * | 6/2016 | |
| WO | 2016115132 A1 | 7/2016 | |

OTHER PUBLICATIONS

Shingo Futamura, "Deformation Index—Concept for Hysteretic Energy-Loss Process", vol. 69, pp. 57-,The Bridgestone/Firestone, Inc., Central Research Laboratories, Akron, OH, Dec. 8, 1989.
Zeon Product Sheet Resins & SIS; Hydrocarbon-Resins, Styrene Isoprene Block Copolymer (Year 2014) https://www.zeon.eu/resins-sis.html.

* cited by examiner

GUAYULE TIRE TREAD COMPOUND

CROSS-REFERENCE TO RELATED APPLICATIONS

This application claims the benefit of U.S. Provisional Application No. 62/458,293, filed on Feb. 13, 2017. The entire disclosure of the above application is hereby incorporated herein by reference.

FIELD

The present disclosure relates to rubber compositions for tires and, more particularly, guayule-based natural rubber compositions for use as tread for tires.

BACKGROUND

The tire industry is extremely competitive, and as such it is important to be able to switch raw materials as prices change. In passenger tire treads, the typical elastomer system is a mixture of styrene-butadiene rubber (SBR) and polybutadiene rubber (BR). The SBR may be a solution-based polymer or an emulsion-based polymer. The BR is typically of a high-cis type. SBR is usually used in a greater amount in tread compounds having SBR/BR elastomer systems, with the amount and type of the SBR selected based on performance characteristics desired for the tire end use.

The performance of tread compounds is dictated largely by the glass transition temperature (Tg) of the elastomer system. The high-cis BR has a glass transition temperature of approximately −105° C. The Tg of the SBR can be controlled from values ranging from −75° C. (or below) to over 0° C., depending on the styrene and vinyl content. Thus, tread compounds have extreme flexibility for setting the Tg of the tread compound by both the ratio of the SBR to BR and the styrene/vinyl content in the SBR. Depending on pricing, the SBR/BR ratio can also be optimized for price within a range.

There is an industry need to be able to use more natural rubber in passenger tire compounds, and particularly non-Hevea sources of natural rubber such as guayule-derived natural rubber, especially when there is a large difference in the pricing between natural rubber, SBR and BR. Typically, however, natural rubber is only used in limited quantities in passenger tire treads, with most of the material being used in heavy truck and bus tread compounds, which may be all natural rubber. Ideally, if natural rubber pricing is low relative to SBR and BR, it would be extremely advantageous to have a tread compound with only natural rubber in the elastomer system, for use in passenger tires.

One of the challenges in using all natural rubber in passenger tread compounds is the low Tg associated with natural rubber (approximately −65° C.). Compounding pure natural rubber with conventional processing oils leads to a low Tg tire tread compound, which would not have the wet traction characteristics necessary for a modern passenger tire.

Additives such as resins have been used in the tire industry for a number of years to improve the processability of tire compounds. These materials can act as homogenizing agents which promote the blending of elastomers, batch-to-batch uniformity, improve filler dispersion, and can improve building tack. These types of resins include hydrocarbon (e.g., C5, C9, mixed C5-C9, dicyclopentadiene, terpene resins, high styrene resins, and mixtures), coumarone-indene resins, rosins and their salts, pure monomer resins, and phenolic resins.

Resins have also been used to adjust the Tg of synthetic tread compounds to maximize properties, such as wear without compromising other properties such as wet traction. For example, U.S. Pat. No. 7,084,228 to Labauze teaches that specific terpene-based resins can be incorporated into SBR/BR tread compounds in such a manner that higher BR levels can be achieved to improve wear, but the Tg of the tire tread compound remains the same.

There is a continuing need for a guayule natural rubber tread compound having an additive that can raise the Tg of the guayule natural rubber, in order to provide an increase in the Tg to improve wet traction, while not adversely affecting properties such as rolling resistance or wear. Desirably, only a small amount of such an additive would be required so as to minimize cost.

SUMMARY

In concordance with the instant disclosure, a guayule natural rubber tread compound having an additive that can raise the Tg of the guayule natural rubber, in order to provide an increase in the Tg to improve wet traction, while not adversely affecting properties such as rolling resistance or wear, and which requires only a small amount of such an additive so as to minimize cost, has been surprisingly discovered.

In one embodiment, a tire tread composition includes a quantity of an elastomer and a quantity of a hydrocarbon resin substantially evenly distributed throughout the elastomer. The elastomer includes guayule natural rubber, and in particular embodiments consists entirely of guayule natural rubber. The hydrocarbon resin is used in an amount greater than about 10 phr. The hydrocarbon resin also has a predetermined miscibility at a predetermined concentration in the guayule natural rubber as measured by a deviation of actual Tg for an elastomer-resin mixture consistent with the elastomer and hydrocarbon resin used in the tire tread composition from predicted Tg for the elastomer-resin mixture.

As used herein, the phrase "an elastomer-resin mixture consistent with the elastomer and hydrocarbon resin used in the tire tread composition" means that the per weight ratio of the resin to the elastomer in the elastomer-resin mixture is substantially the same as the per weight ratio of the resin to the elastomer in the tire tread composition.

In particular, the predetermined miscibility in the elastomer-resin mixture is less than about six percent (6%) deviation in the actual Tg from the predicted Tg when 20 phr of the resin is used in the elastomer-resin mixture. In this embodiment, the effects of fillers and oils on the Tg are advantageously removed from consideration, as only the elastomers that are in the tire tread composition, at their relative loadings, are considered for determining deviation of actual Tg from the predicted Tg.

In another embodiment, the elastomer-resin mixture employed to ascertain the effect of the hydrocarbon elastomer on the Tg may be the same or nearly the same as the tire tread composition. For example, the elastomer-resin mixture may be compounded to have the same additive materials that have an effect on the Tg, at the same relative concentrations as the tire tread composition. In particular, the tire tread composition may include a quantity of an elastomer and a quantity of a hydrocarbon resin substantially evenly distributed throughout the elastomer. The elastomer includes guayule natural rubber, and in particular embodiments consists entirely of guayule natural rubber. The hydrocarbon resin has a predetermined miscibility at a predetermined concentration in the guayule natural rubber. The predetermined miscibility is measured by a deviation of actual Tg for the tire tread composition from predicted Tg for the tire tread composition. In particular, the predetermined miscibility in the guayule natural rubber is less than about six percent (6%) deviation in the actual Tg from the predicted Tg of the tire tread composition when 20 phr resin is used in the tire tread composition. In this embodiment, the fillers and oils in the tire tread composition will have an effect on the actual Tg, which are adjusted for or otherwise taken into account in determining the deviation of actual Tg from the predicted Tg.

In a particular embodiment, the present disclosure includes a guayule natural rubber tread compound with a high softening point resin that is designed to be compatible with the guayule natural rubber. Compatibility of the resin with the polymer system is important in tread compounds, because as the resin/polymer system becomes incompatible, the resin has less of an effect on the Tg of the elastomer system, and can actually form a separate phase in the polymer matrix which can degrade dynamic properties. Some resins are compatible with guayule natural rubber to a limited extent, but the compatibility will depend on the polarity difference between the resin and the polymer, the molecular weight of the resin and any functional group the resin or polymer may contain.

It has been found that one way to measure compatibility is to compare the actual Tg of a system to a predicted Tg calculated for completely miscible systems. Although a variety of mathematical models may be used to predict Tg, and are all considered to be within the scope of the present disclosure, such a calculation can be made using the Fox equation (shown below), which relates the weight percent of each component to the overall glass transition temperature.

$$\frac{1}{T_g} = \frac{x_1}{T_{g,1}} + \frac{1-x_1}{T_{g,2}}.$$

where Tg is the overall glass transition of the blend, Tg,1 is the glass transition temperature of component 1, Tg,2 is the glass transition of component 2 and x1 is the weight fraction of component 1.

This equation indicates that the higher the Tg of the high Tg component in such a blend, the less of the high Tg component is required to achieve any particular Tg for the blend. In polymer systems for tire treads, this means that the higher the glass transition temperature of the resin, the less is necessary to adjust the overall Tg of the compound to a higher value.

It should be understood that suitable mathematical models for use with the present disclosure will predict Tg with at least as much accuracy as the well-known Fox equation, and thus yield substantially the same predictions. Accordingly, the predetermined miscibility of less than six percent (6%) deviation for the Fox equation prediction at 20 phr of resin in the elastomer-resin mixture applies equally to these other suitable mathematical models.

There are practical limits to this benefit. For example, the resin and polymer systems must be mixed, and typical mixing temperatures for tread compounds do not exceed 165° C. This temperature is achieved for a very limited time, so the resin must first soften so it can be completely incorporated into the polymer matrix. Thus, resins with softening points higher than 165° C. have been found unsuitable for tire tread compound of the present disclosure. It has also been found that the dump temperature during master mixing should be at least 20-30° C. above the softening point of the resin in order to ensure sufficient incorporation with the elastomer system.

A practical lower limit for resin softening point is 110° C., because below this level much higher levels of resin are required to achieve the desired Tg of the overall compound. Softening point and glass transition temperatures are often related for hydrocarbon resins, with softening points being approximately 45° C. higher than the Tg.

It should be appreciated that that incompatible systems will not follow this Fox equation, and Tg behavior in Differential Scanning Calorimetry (DSC) can vary substantially as a result. An example of this incompatibility determination is graphically depicted in FIG. 1. For grossly incompatible systems, the original Tg for both components are seen, but what is more typical are shifts in Tg of each component, depending on the degree of compatibility. The further away the mixture Tg is from the value predicted by the Fox equation, the less compatible the system should be considered. Substantially complete compatibility is desirable for tire tread compounds.

In another embodiment, the tire tread compound of the present disclosure relates to the use of specific resins in 98% cis-polyisoprene polymers. This includes both natural or synthetic rubber formulations. The natural rubber can be derived from any source. Hevea is the most common, but guayule and Russian dandelion can also be used. In a most particular embodiment, guayule-based natural rubber is used, in part due to the surprising and unexpected performance benefits discovered with guayule-based natural rubber, which are detailed further hereinbelow.

Synthetic high cis polyisoprene is well known in the industry and is commercially available as Natsyn® 2200 from Goodyear Chemical, and SKI-3™ from the Joss Group. Limitations on the resin will include softening points between 110-165° C., for example, as determined by the ring and ball method described at ASTM D6493, titled "Standard Test Methods for Softening Point of Hydrocarbon Resins and Rosin Based Resins by Automated Ring-and-Ball Apparatus". Limitations on the resin will also include observed Tg values for mixtures of the resins with NR within 6% of what is predicted (for example, by the Fox equation), and in a most particular embodiment within 5% of what is predicted. It was found that resins within this range show good compounding performance, specifically for wet traction.

BRIEF DESCRIPTION OF THE DRAWINGS

The above, as well as other advantages of the present disclosure, will become readily apparent to those skilled in the art from the following detailed description, particularly when considered in the light of the drawings described herein.

DETAILED DESCRIPTION

Figure 1:
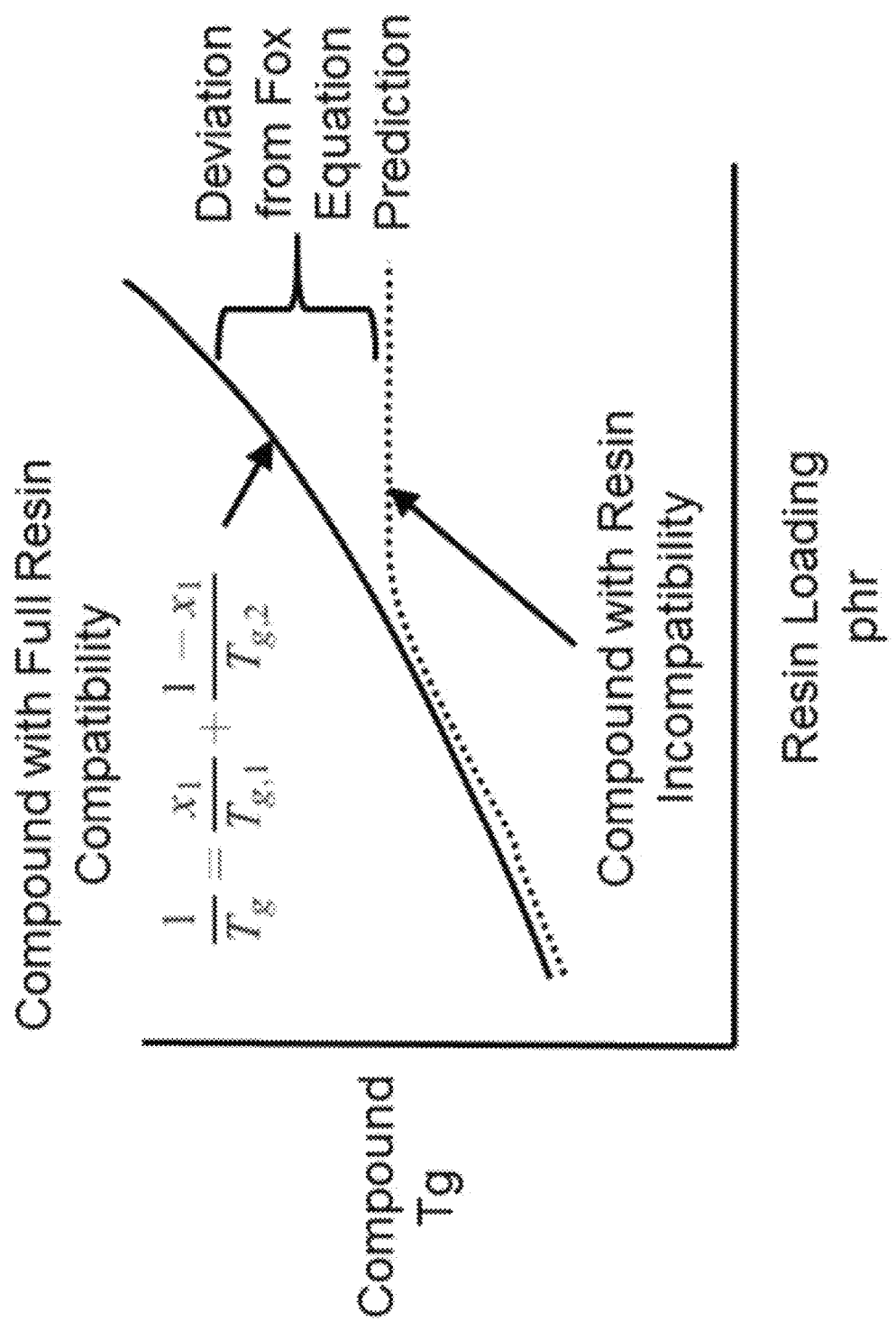
FIG. 1 is a model of a first rubber compound (shown in solid line) having a resin with full compatibility, as determined by consistency between the actual Tg and the Tg predicted by the Fox equation (also shown by the solid line), and a second rubber compound (shown in dashed line) deviating from the Tg predicted by the Fox equation, and thus illustrating an incompatible resin where the curve for the second rubber compound exhibits significant deviation from the curve for the first rubber compound. Since the compatibility of the "incompatible" resin is very limited, once the elastomer is saturated with resin, the resin will not have a major effect on the Tg of the composite and thus there is a flattening of the curve. It should be appreciated that the resin may form a separate phase if it is sufficiently incompatible.
Figure 2:
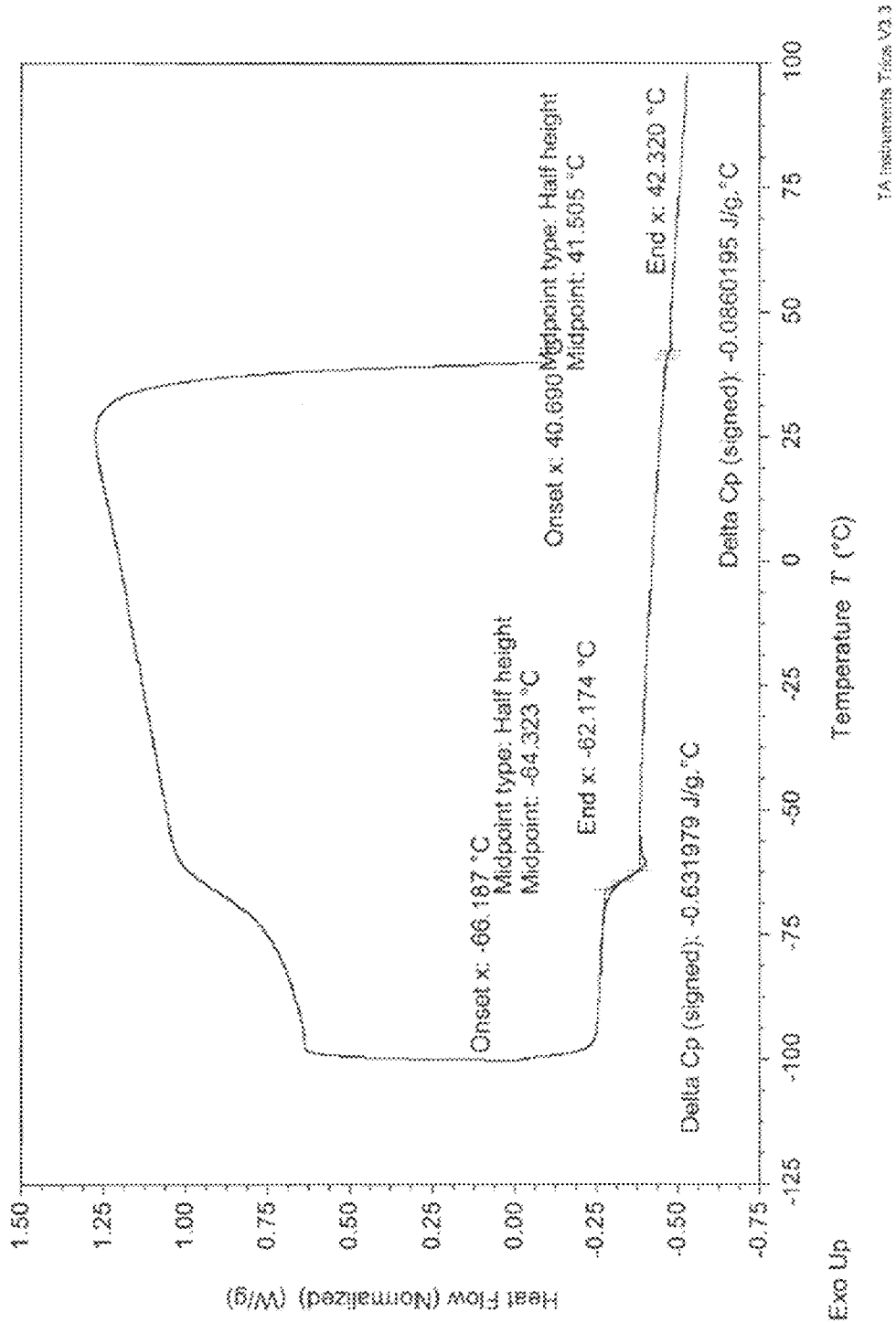
FIGS. 2-9 show DSC test results for two different resin types at various PHR loadings in natural rubber compositions, with one of the resins being compatible as described herein, and the other of the resins being incompatible as described herein.
Figure 3:
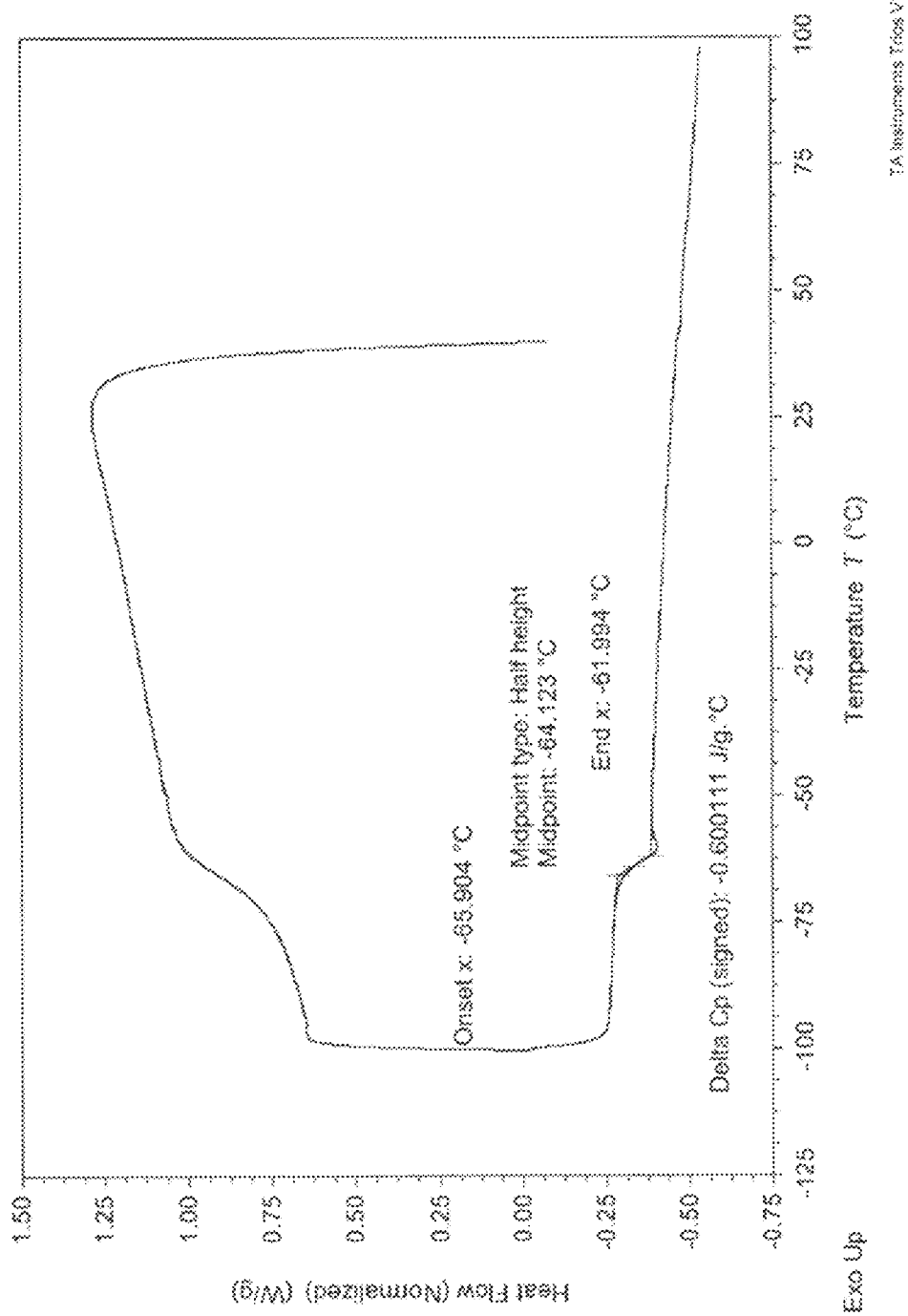
Figure 4:
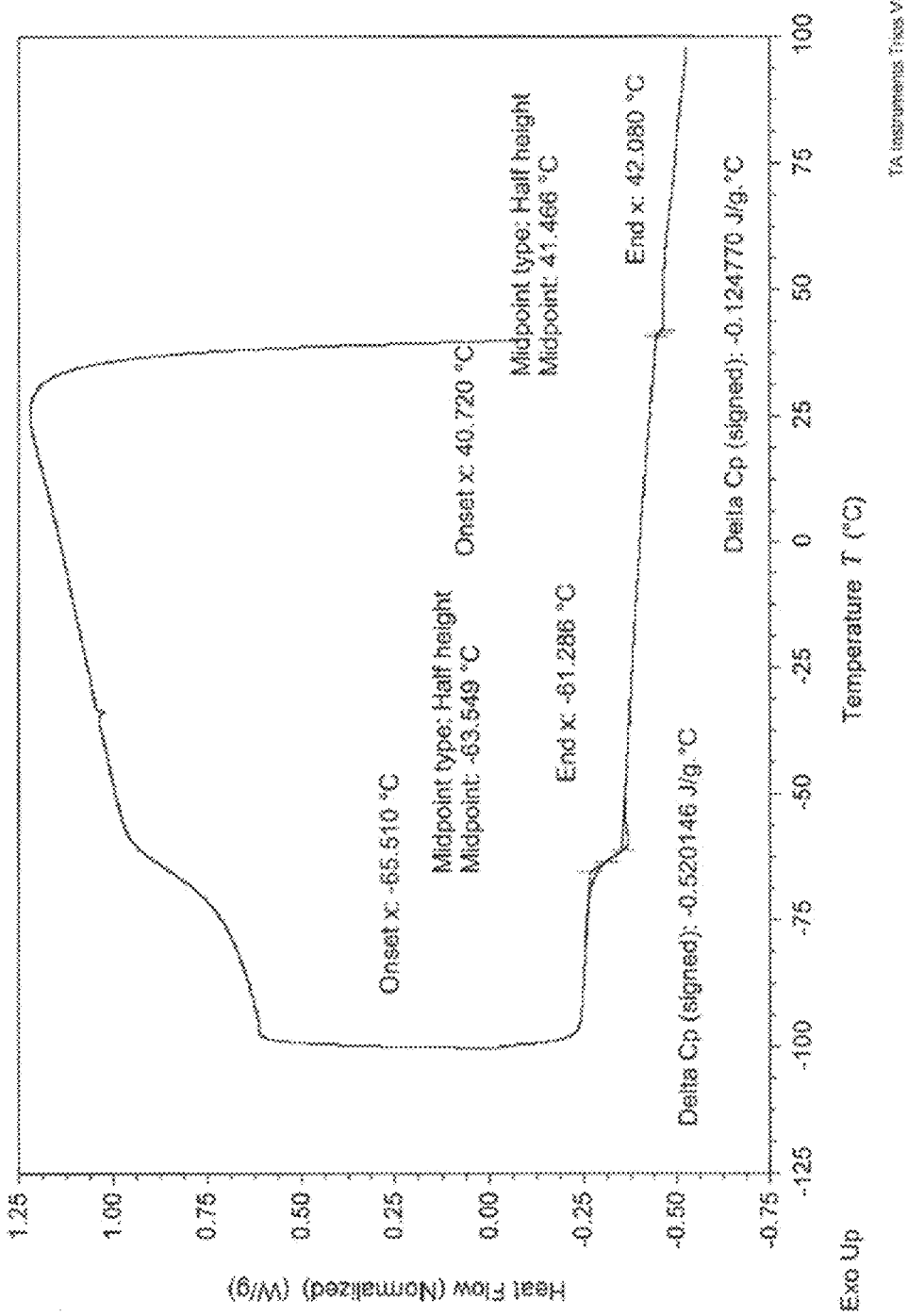
Figure 5:
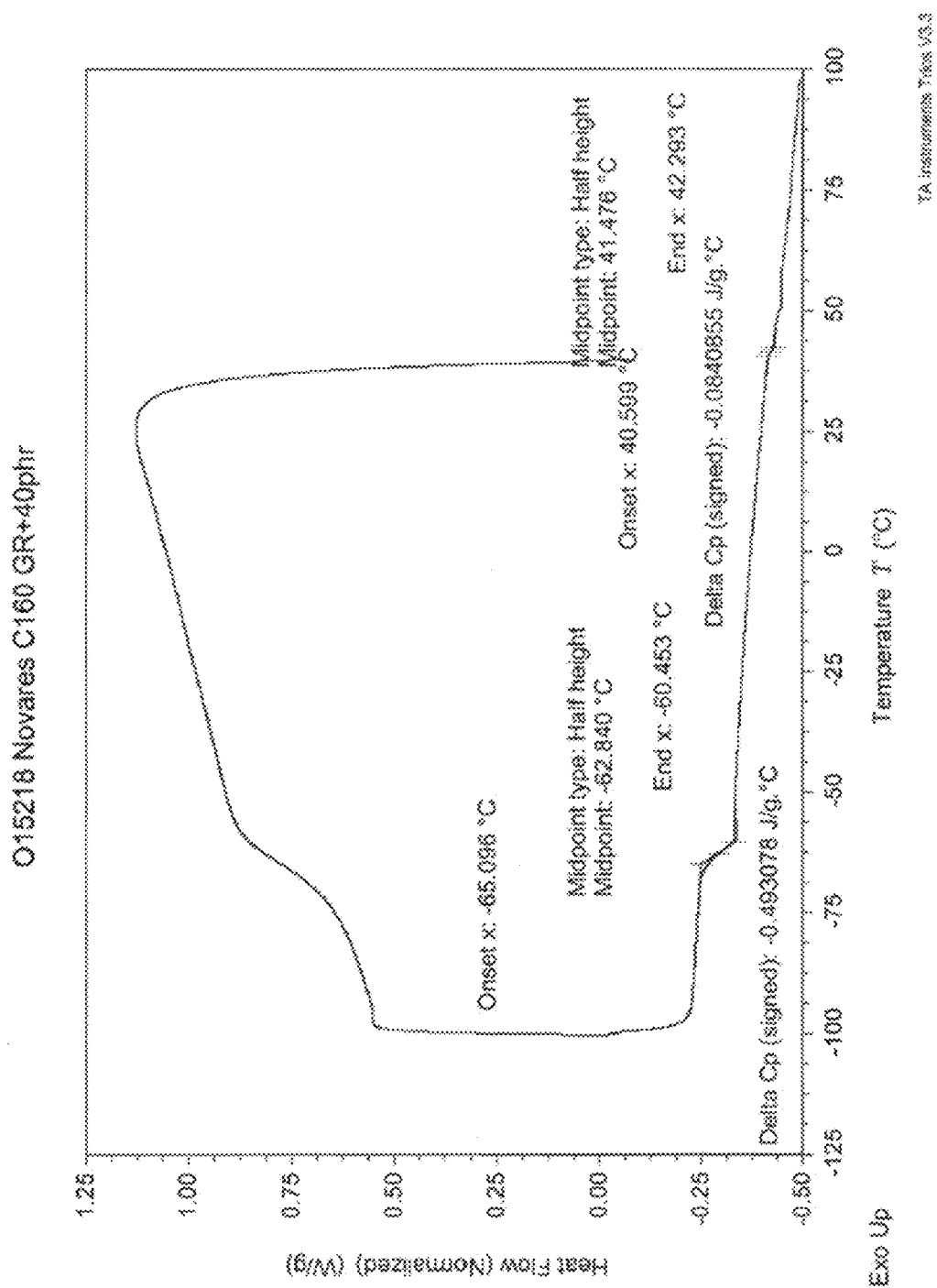
Figure 6:
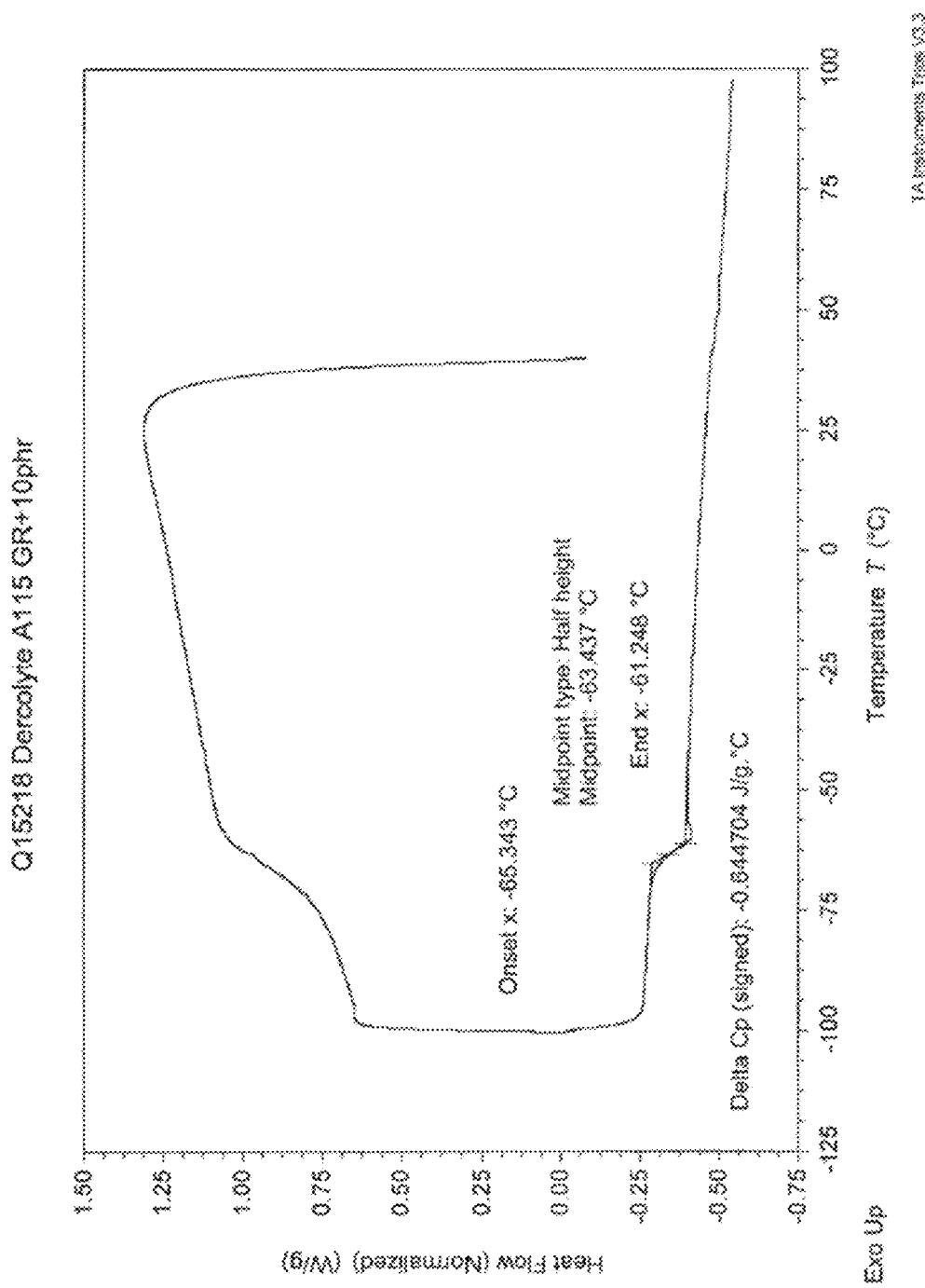
Figure 7:
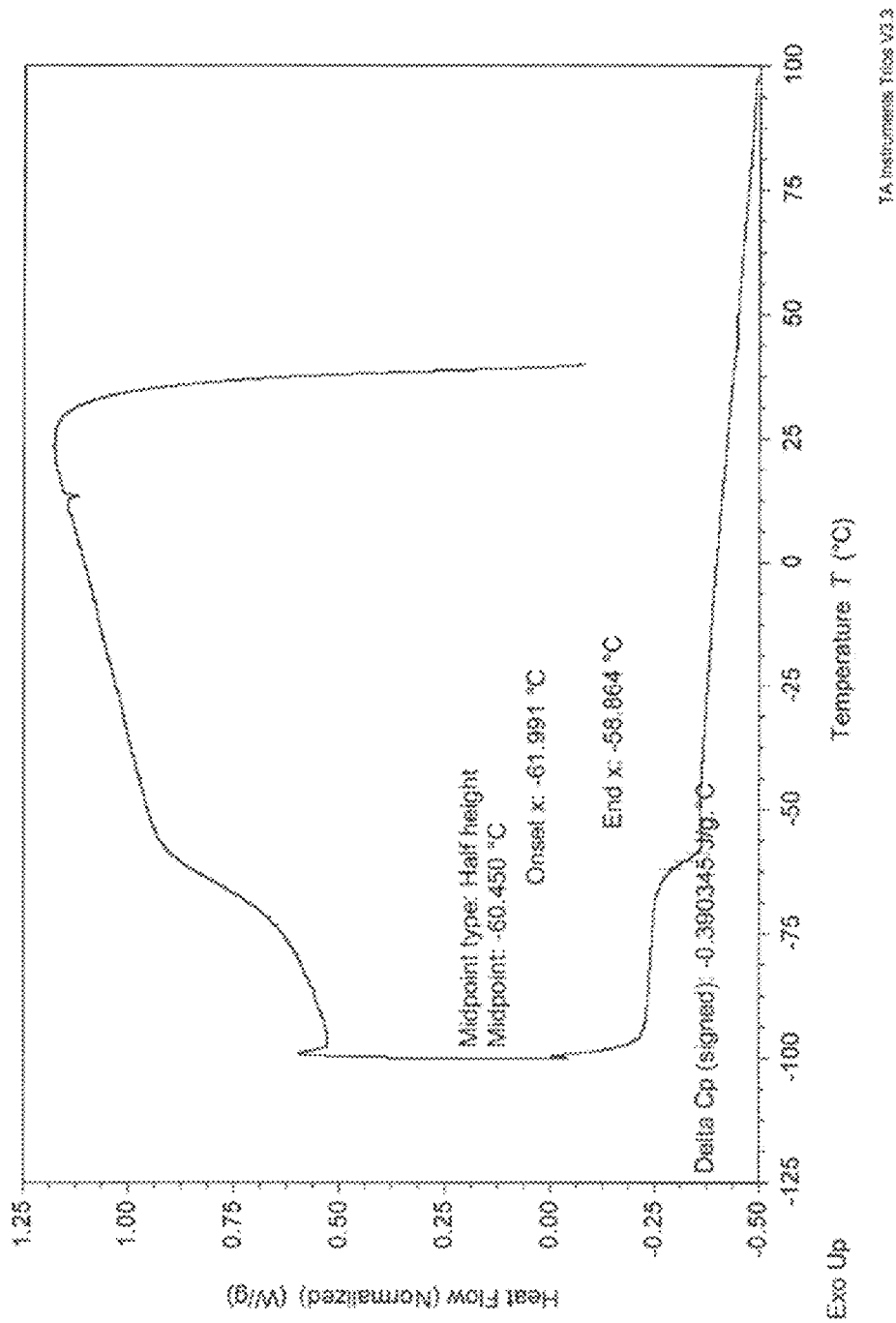
Figure 8:
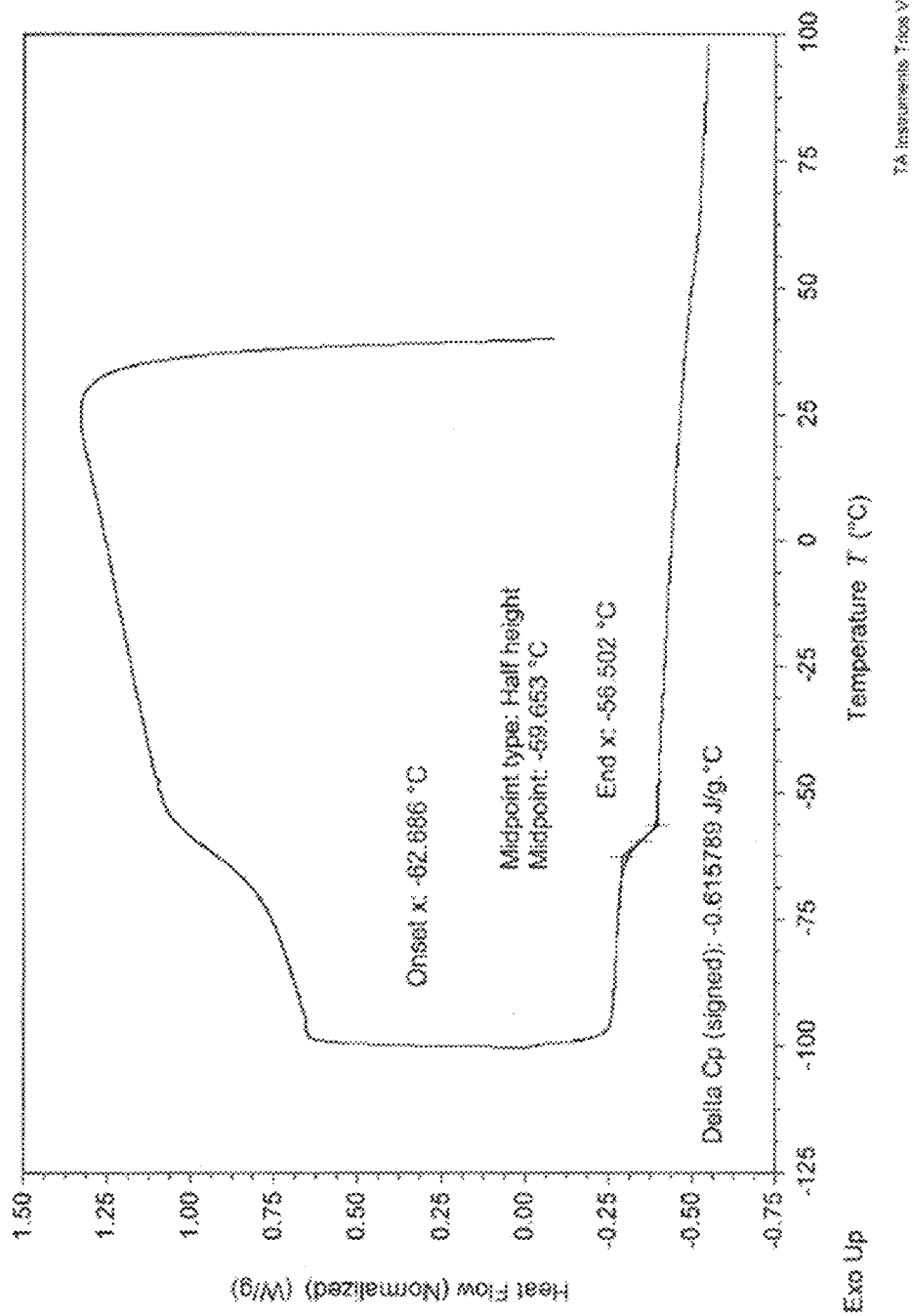
Figure 9:
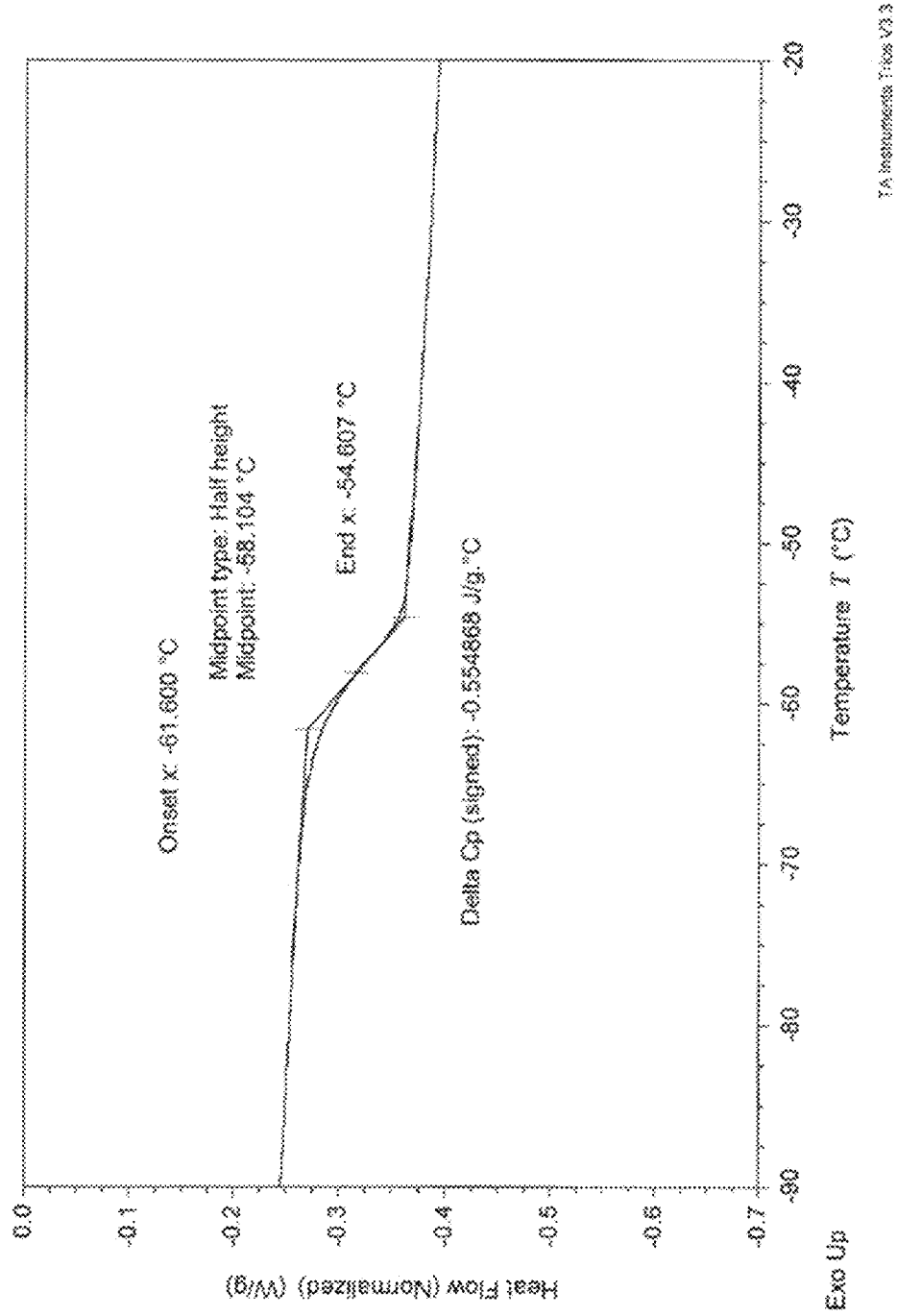

The following detailed description and appended drawings describe and illustrate various embodiments of the composition. The description and drawings serve to enable one skilled in the art to make and use the composition, and are not intended to limit the scope of the composition in any manner. In respect of the methods disclosed, the steps presented are exemplary in nature, and thus, the order of the steps is not necessary or critical unless otherwise disclosed.

The present disclosure includes a rubber formulation having a quantity of elastomer, and a quantity a hydrocarbon resin. The hydrocarbon resin is substantially evenly distributed throughout the elastomer, for example, by a mixing operation prior to an extrusion or molding operation, as nonlimiting examples. It should be understood that the substantially even distribution of the resin through the elastomer may be facilitated by a thorough mixing operation, and that the ability to perform such mixing operations is possessed by of one of ordinary skill in the art.

The rubber formulation can be compounded by methods known in the rubber compounding art, such as mixing various sulfur-vulcanizable constituent polymers with various commonly used additive materials as, for example, curatives such as sulfur, activators, retarders and accelerators, processing additives such as oils, for example, tackifying resins, silicas, plasticizers, fillers, pigments, fatty acid, zinc oxide, waxes, antioxidants and antiozonants, peptizing agents, and reinforcing materials such as, for example, carbon black, and the like. Other suitable additives for rubber formulations may also be used, as desired. Depending on the intended use of the rubber formulation, the common additives are selected and used in conventional amounts.

In a particular embodiment, the elastomer system includes guayule natural rubber. In a most particular embodiment, the elastomer system consists entirely of guayule natural rubber. The resin type and loading is selected so as to provide a desired compatibility of the resin with the guayule natural rubber of the elastomer system.

It has been found that certain hydrocarbon resins, which it should be appreciated are different from coumarone-indene resins, phenolic resins and alpha-methylstyrene (AMS) resins, are particularly suitable for this purpose. Although the type and loading of resin is primarily constrained by compatibility, as defined by correspondence of actual Tg with predictions for Tg at a particular resin loading level, the molecular weight (Mn) of the selected hydrocarbon resin is typically between 500-3000 g/mol, and does not typically exceed more than 4000 g/mol in order to provide sufficient compatibility with the natural rubber.

Although the Fox equation is identified herein as a particularly suitable calculation for prediction of Tg at a particular resin loading level, one of ordinary skill in the art should understand that other equations and models, e.g., artificial intelligence models and the like, may also be employed within the scope of the disclosure to predict the Tg at the particular resin loading level, as desired. Thus, the present disclosure is not limited to the application of the Fox equation to the problem of resin miscibility in polymer.

The resin is added to the rubber formulation to a level where the total compound Tg is in a desired range, e.g., between about −50° C. and −5° C. In particular, the loading of resin may also be maximized to as to provide the desired compound Tg and related traction performance, but not be so high as to prevent mixing under conventional mixing operations.

In particular, the level of the resin added may be between about 5 phr and about 40 phr. For example, the resin may be added to the level of at least about 10 phr, in certain examples at least about 15 phr, and in even further examples at least about 20 phr. One of ordinary skill in the art may select a suitable resin level within this range depending on the end application of the tire tread and the resin type selected, as desired.

Through testing of the Tg of natural rubber compounds with different resin types and different resin loadings, it has been surprisingly found that certain types of hydrocarbon resins are most compatible with the natural rubber of the elastomer system at the aforementioned loading levels, and therefore have the desired effect on the overall Tg of the resulting tread compound. As nonlimiting examples, the resin employed in the tire tread composition of the present disclosure may be selected from the group consisting of cycloaliphatic hydrocarbon resins, aliphatic hydrocarbon resins, polymerized pinene resins (alpha or beta), and hydrocarbon resins produced by thermal polymerization of mixed dicyclopentadiene (DCPD) and aromatic styrenic monomers derived from petroleum feedstocks, and combinations thereof.

One example of a suitable resin is the cycloaliphatic hydrocarbon resin known as ESCOREZ™ 5340 resin, which is one of a 5300 series of resins commercially available from the ExxonMobil Chemical Company. The ESCOREZ™ 5340 resin is a water white cycloaliphatic hydrocarbon resin, originally designed to tackify a variety of adhesive polymers including ethylene vinyl acetate (EVA), styrenic block copolymers such as SIS, SBS, and SEBS block copolymers, metallocene polyolefins, an amorphous polyolefins such as APP and APAO. The ESCOREZ™ 5340 resin is typically provided in pellet form, and has a typical softening point of about 283.1° F. (139.5° C.) based on the ETM 22-24 testing specification. ETM testing specifications are published ExxonMobil Test Methods used in the Americas region, and are developed from ASTM test methods and available from ExxonMobil upon request, and are hereby incorporated herein by reference. The ESCOREZ™ 5340 resin has a melt viscosity (356° F. (180° C.)) of 3600 cP (3600 mPa*s) based on ETM 22-14. The molecular weight-number average (Mn) for the ESCOREZ™ 5340 resin is about 400 g/mol, and the molecular weight-weight averages (Mw) is about 730 g/mol, both based on ETM 300-83. The glass transition temperature for the ESCOREZ™ 5340 resin is about 187° F. (86° C.), based on ETM 300-90.

Another example of a compatible resin is the aliphatic hydrocarbon resin known as ESCOREZ™ 1102 resin, which is one of a 1000 series of resins commercially available from the ExxonMobil Chemical Company. The ESCOREZ™ 1102 resin was originally designed as a binder for use in a variety of applications, including for thermoplastic road marking formulations. The ESCOREZ™ 1102 resin is a yellow aliphatic hydrocarbon resin, typically provided in pellet form. It should be appreciated that the ESCOREZ™ 1102 resin has a softening point of about 212.0° F. (100° C.) based on the ETM 22-24 testing specification, however, this resin falls outside the optimal range of softening points for material utilization and this is not considered suitable for the present application. The ESCOREZ™ 1102 resin has a melt viscosity (320° F. (160° C.)) of 1650 cP (1650 mPa*s) based on ETM 22-31. The molecular weight-number average (Mn) for the ESCOREZ™ 1102 resin is about 1300 g/mol based on ETM 300-83. The molecular weight-weight average (Mw) is about 2900 g/mol based on ETM 300-83. The glass transition temperature for the ESCOREZ™ 1102 resin is about 126° F. (52° C.) based on ETM 300-90.

A further example of a suitable resin is the polymerized alpha pinene resin known as DERCOLYTE A™ 115 resin, which is one of a series of polyterpenic resins commercially available from DRT (Dérivés Résiniques et Terpéniques), headquartered in Southwestern France. The DERCOLYTE A™ 115 resin is typically provided in the form of flakes. The DERCOLYTE A™ 115 resin is produced for the polymerization of alpha pinene, and was originally developed as a tackifying resin to improve the adhesive properties (i.e., tack and adhesion) of hot melt formulations or solvent adhesives. The DERCOLYTE A™ 115 resin has a softening point, Ring and Ball method, of about 239° F. (115° C.). The molecular weight-weight average (Mw) is about 900 g/mol. The glass transition temperature of the DERCOLYTE A™ 115 resin is about 158° F. (70° C.).

Yet another example of a suitable resin is the LX®-1144LV resin, a thermoplastic, low molecular weight, hydrocarbon resin produced by thermal polymerization of DCPD and aromatic styrenic monomers derived from petroleum feedstocks, which is one of a series of hydrocarbon resins commercially available from the Neville Chemical Company, in Pittsburgh, Pa., USA. The LX®-1144LV resin is available in light yellow flakes. The LX®-1144LV resin was originally developed for polyalphamethylestyrene (PAMS) concrete cure compounds. The LX®-1144LV resin has a softening point (Ring and Ball method) of about 230° F. (110° C.+/−5° C.) using the ASTM E28 test method. The LX®-1144LV resin has a molecular weight-number average (Mn) of about 500 g/mol, and a molecular weight-weight average (Mw) of about 1,100 g/mol, both using the ASTM D3536 test method. All relevant ASTM test methods are hereby incorporated herein by reference.

Through laboratory testing of the Tg of natural rubber compounds with different resin types and different resin loadings, it has also been surprisingly found that certain types of resins are least compatible with the natural rubber of the elastomer system at the aforementioned loading levels, and therefore do not have the desired effect on the overall Tg of the resulting tread compound. As nonlimiting examples, the resin employed in the tire tread composition of the present disclosure may not be selected from the group consisting of and indene-coumarone resins, phenolic resins, alpha-methylstyrene (AMS) resins, and combinations thereof.

One example of an unsuitable resin is the Novares™ C160 resin, which is one of a series of coumarone-indene based resins commercially available from RUTGERS Novares GmbH in Duisburg, Germany. The Novares™ C160 resin was originally developed as a tackifier for hot melt adhesives and ethylene co-terpolymers such as EVA and EMA. It is typically provided in the form of flakes, and has a softening point (Ring and Ball Method) of about 311-329° F. (155-165° C.).

Another example of a unsuitable resin is the DUREZ® C 160 resin. The DUREZ® C 160 resin is thermoplastic alkyl phenol based resin, which is one of a series of novolac or phenol-fomaldehyde thermoplastic resins obtained under acid catalyst conditions that cannot react further without the addition of a cross-linking agent, commercially available from Sumitomo Bakelite High Performance Plastics, and business unit of Sumitomo Bakelite Co., Ltd. The DUREZ® C 160 resin has a softening point (Ring and Ball) of about 201° F. (94° C.) using DCT test method DCT 104, available from Sumitomo Bakelite Co., Ltd and incorporated herein by reference. The measured Tg for the DUREZ® C 160 resin is about 120° F. (49° C.).

Yet another example of an unsuitable resin is the KRATON™ AT8602 resin, which is one of a series of α-Methyl Styrene (AMS) resins commercially available from Kraton Corporation, and developed as aromatic tackifiers having low odor and water-white color. The softening point (Ring and Ball) of the KRATON™ AT8602 resin is about 239° F. (115° C.). The measured Tg for the KRATON™ AT8602 resin is about 160° F. (71° C.).

It should be appreciated that the rubber formulation of the present disclosure includes no natural plasticizers, such as sunflower oil, canola oil, etc. Not only are such natural plasticizers more expensive, but they are also known to affect wet traction undesirably. Thus, the use of natural plasticizers is believed to be counter to an object of the present disclosure, which is to enhance wet traction through the use of suitable resin types and particular resin loadings in the rubber formulation containing natural rubber.

The present disclosure also includes an article comprising the rubber formulation having the guayule natural rubber and the hydrocarbon resin having a predetermined miscibility at a predetermined concentration. It should be appreciated that the rubber formulation may be extruded, molded, or otherwise formed into a desired shape and cured through the application of at least one of heat and pressure. As a particular example, the rubber formulation may be used in a tire as a tread. For this purpose, the actual Tg of the elastomer-resin mixture present in the rubber formulation may be between about −80° C. and about −15° C., with the elastomer-resin mixture consisting of natural rubber typically being between −65° C. and about −15° C.

The following examples are presented for the purposes of illustrating and not limiting the present invention. All parts are parts by weight unless specifically identified otherwise.

EXPERIMENTAL

Example 1

Evaluation of Resin in Natural Rubber Tire Tread Compositions

The evaluated resins are identified in TABLE 1 and TABLE 2 below, along with key properties for the resins.

TABLE 1

| Resin | Supplier | Resin Type | Softening Point (° C.) |
|---|---|---|---|
| ESCOREZ ™ 5340 | Exxon | Hydrogenated DCPD | 137 |
| ESCOREZ ™ 1102 | Exxon | C-5 Hydrocarbon | 100 |

TABLE 1-continued

| Resin | Supplier | Resin Type | Softening Point (° C.) |
|---|---|---|---|
| DERCOLYTE ™ A115 | Meade Westvaco | α-Pinene | 115 |
| NEVILLE ™ 1144-LV | Neville | Thermal Resin/DCPD | 110 |
| NOVARES ™ C160 | Rutgers | Coumarone-Indene | 160 |
| DUREZ ™ 29095 | Durez | Phenol Formaldehyde | 94 |
| KRATON ™ AT8602 | Kraton | α-Methyl Styrene | 115 |

TABLE 2

| Resin | Tg (Measured) (°K) | Mw (g/mol) | Mn (g/mol) |
|---|---|---|---|
| ESCOREZ ™ 5340 | 364 | 730 | 400 |
| ESCOREZ ™ 1102 | 333 | 2900 | 1300 |
| DERCOLYTE ™ A115 | 352 | 900 | N/A |
| NEVLLE ™ 1144-LV | 334 | 1,100 | 500 |
| NOVARES ™ C160 | 363 | N/A | N/A |
| DUREZ ™ 29095 | 322 | N/A | N/A |
| KRATON ™ AT8602 | 344 | N/A | N/A |

Compound Performance:

The compound formulation for the 100% natural rubber tread compounds that were evaluated is shown below in TABLE 3, and employed resin at a 20 phr level.

TABLE 3

| Ingredient | Loading (phr) |
|---|---|
| Natural Rubber | 100.00 |
| Carbon Black | 6.00 |
| Silica | 70.00 |
| Silane | 6.30 |
| Resin | 20.00 |
| Zinc Oxide | 3.00 |
| Stearic Acid | 1.00 |
| Antidegradant | 3.50 |
| Process Aid | 7.00 |
| Curative | 6.63 |
| Total PHR: | 223.43 |

The compounds according to TABLE 3 were mixed on a 5.5 intermesh mixer using conventional mixing protocols.

DSC Test Method:

The DSC testing was performed on a TA Instruments Discovery series DSC. The test method for the DSC analysis is as follows: 1. Equilibrate at 40° C. 2. Ramp at 30°/min to −100° C. 3. Maintain temperature at −100° C. for 5 min. 4. Ramp at 10° C./min to 100° C.

Sample Preparation for DSC:

To prepare the DSC samples that were compared to the results of the Fox equation, 5 g of guayule rubber was dissolved in 100 mL of cyclohexane. For each 5 g sample of guayule rubber, the appropriate amount of resin was then dissolved in 10 mL of cyclohexane and added to the dissolved rubber mixture, to thereby create the elastomer-resin mixture for evaluation. It should be appreciated that the elastomer-resin mixture is substantially free of fillers and plasticizers, which would otherwise be found in tire tread compositions and may affect the Tg of the tire tread compositions. For each resin that was evaluated, resin was added at 10 phr (0.5 g), 20 phr (1.0 g), 30 phr (1.5 g), and 40 phr (2.0 g) levels such that four samples of guayule rubber mixed with resin were prepared for each resin.

After the rubber and the resins were completely dissolved in the solvent, the solution was poured out on aluminum foil and allowed to dry in the hood overnight. To ensure that all of the solvent had been removed, the samples were then placed in a circulating air oven set to 50° C. for 1 hour increments until constant weight was achieved. The samples were then tested using DSC to identify the Tg of the elastomer-resin mixture. FIGS. 2-9 depict the DSC scans of the NOVARES™ C160 resin and the DERCOLYTE™ A115 resin at each level or loading in the guayule rubber. TABLE 4, which is shown and detailed further herein below, recites the measured Tg for each evaluated resin at a 20 phr level.

Results:

Selected results are shown below in TABLE 4 and in FIGS. 2-9 for the DSC analysis of the elastomer-resin mixtures and the compound data for compounds containing those mixtures.

TABLE 4

| Sample (GR = Guayule Natural Rubber) | Actual Tg (K) | Fox Equation Predicted Tg (K) | Actual Tg vs. Predicted Tg Difference - Solvent Casting (%) | Wet Handling Compound Data (TanD @ 0° C., Indexed) |
|---|---|---|---|---|
| NO RESIN | N/A | N/A | N/A | 100 |
| GR + 20 phr NEVILLE ™ 1144-LV | 213.09 | 222.11 | 3.81% (<4%) | 150 |
| GR + 20 phr DERCOLYTE ™ A115 | 212.70 | 223.38 | 452% (<5%) | 145 |
| GR + 20 phr ESCOREZ ™ 1102 | 211.12 | 222.04 | 4.65% (<5%) | 144 |
| GR + 20 phr ESCOREZ ™ 5340 | 212.43 | 224.16 | 4.97% (~5%) | 138 |
| GR + 20 phr NOVARES ™ C160 | 209.03 | 224.09 | 6.47% (>6%) | 113 |
| GR + 20 phr DUREZ ™ 29095 | 208.86 | 221.20 | 5.58% (>5%) | 115 |
| GR + 20 phr KRATON ™ AT8602 | 208.51 | 222.76 | 6.40% (>6%) | 92 |

Based on the DSC data in comparison with the Fox equation, the resins were ranked in terms of expected performance based on how closely the experimental data lined up with the Fox equation model. The resins with a higher difference from the Fox equation were deemed likely to be less miscible with natural rubber and thus have inferior performance to the more miscible resins. It should be appreciated that the percentage difference in actual Tg and predicted Tg discussed herein is made relative to Tg in degrees Kelvin (K) as the unit of measure.

Based on this expectation, the resins with a lower % difference from the Fox equation Tg prediction were given the best rank (1), whereas the resins with a higher % difference were given the worst rank (8). The compounded sample that was tested with no resin was assigned the lowest ranking with the expectation of inferior wet handling performance. When comparing the ranking of the DSC analysis with the ranking of the Tan δ at 0° C. (i.e., a wet handling indicator), it can be observed that the rankings of the resins are identical.

The results for the wet handling indicator show that the NEVILLE™, DERCOLYTE™, and ESCOREZ™ resins have similar expected wet traction performance. However, the NOVARES™ resin is expected to have inferior wet traction to that of the other resins based on the data, i.e., the directionally lower Tan δ at 0° C. This was the expected result due to the fact that a coumarone indene resin is not as miscible in natural rubber as hydrocarbon resins.

In addition to the laboratory test results detailed hereinabove, actual test tires were manufactured with the natural rubber tread compound according to the present disclosure, and identified in TABLE 3. Control tires used entirely synthetic rubber tread compounds.

Conventional wet braking and wet handling testing was performed with the test and control tires, and the normalized test results are shown below in TABLE 5 and in FIG. 10.

TABLE 5

| Feature | Indexed Wet Braking (Higher is better) | Indexed Wet Handling (Higher is better) |
| --- | --- | --- |
| Control | 100.0 | 100.0 |
| 100% Hevea NR Tread w/ 20 phr resin (High softening point, and Compatible within 6% of Fox Equation prediction at 20 phr) | 106.6 | 104.7 |

Figure 10:
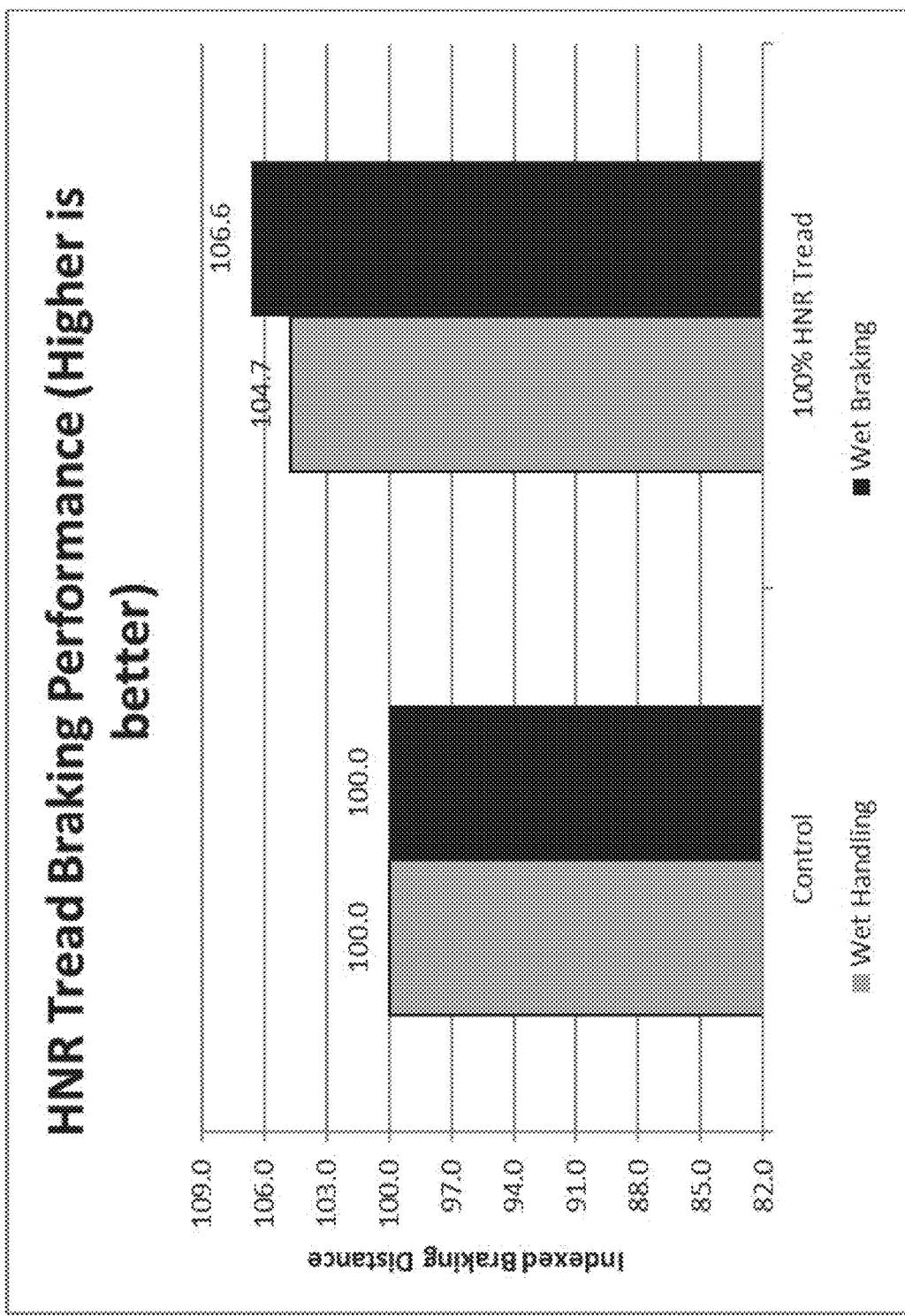
FIG. 10 is a bar graph depicting comparative tire testing results for wet handling and wet braking with a natural rubber tread compound according to the present disclosure relative to an entirely synthetic rubber tread compound.

As shown in TABLE 5 and in FIG. 10, the natural rubber tread compound according to the present disclosure resulted in directional improvements in both wet braking and wet handling in the actual tire testing.

Comparing the wet traction results from compounds using the rubber/resin ratios used in the rubber/resin DSC testing and the percentage differences or deviation from the predicted glass transition temperatures, it has been established that the upper limit for miscibility with natural rubber is approximately 6%, where any resin and polymer mixture that differs from the predicted glass transition temperatures by 6% or more is outside the scope of the present disclosure. In certain embodiments, it should be appreciated that polymer and resin mixtures that differ from the predicted glass transition temperatures by about 5% or less may be preferred.

Example 2

Comparison of Guayule-Based Natural Rubber to Hevea-Based Natural Rubber in Tire Tread Compositions Compound Performance:
The compound formulation for the 100% natural rubber tread compounds that were evaluated is shown below in TABLE 6, and employed resin at a 20 phr level.

TABLE 6

| Ingredient | Loading (phr) |
| --- | --- |
| Natural Rubber | 100.00 |
| Carbon Black | 6.00 |
| Silica | 70.00 |
| Silane | 6.30 |
| Resin | 20.00 |
| Zinc Oxide | 3.00 |
| Stearic Acid | 1.00 |
| Antidegradant | 3.50 |
| Process Aid | 7.00 |
| Curative | 6.07 |
| Total PHR: | 222.87 |

Two different compounds were prepared according to the formulation of TABLE 6, for purposes of comparison. The first compound contained Hevea-based natural rubber, and the second compound contained Guayule-based natural rubber.

The compounds according to TABLE 6 were mixed in a factory setting using conventional mixing protocols.

The first compound and the second compound were then subjected to conventional laboratory testing. The normalized results of this laboratory testing are shown below in TABLE 7.

TABLE 7

| Performance Compound | Payne Effect | Winter E* @ −20 C. | Wet Tan δ @ −10 C. |
| --- | --- | --- | --- |
| Hevea | 100.0 | 100.0 | 100.0 |
| Guayule | 89.8 | 66.5 | 109.7 |
| Reference | lower is better | lower is better Futamura 1996 | higher is better |

| Performance Compound | Wet Tan δ @ 0 C. | Rolling Resistance Tan δ @ 70 C. | Dry Handling E* @ 60 C. |
| --- | --- | --- | --- |
| Hevea | 100.0 | 100.0 | 100.0 |
| Guayule | 100.7 | 94.4 | 75.6 |
| Reference | higher is better Futamura 1990 | lower is better Futamura 1990 | higher is better Terrill 2013 |

The laboratory testing of the first and second compounds unexpectedly and surprisingly revealed a significant improvement in each of the winter performance, wet performance, and rolling resistance indicators associated with the guayule-based tire tread compound, in comparison to the Hevea-based tire tread compound. Without being bound to any particular theory, it is believed that these differences in physical properties may be due to the presence of different naturally-occurring materials in guayule-based natural rubber compared to conventional Hevea-based natural rubber.

While certain representative embodiments and details have been shown for purposes of illustrating the invention, it will be apparent to those skilled in the art that various changes may be made without departing from the scope of the disclosure, which is further described in the following appended claims.

What is claimed is:

1. A tire tread composition, comprising:
an elastomer including a quantity of guayule natural rubber; and
a quantity of a hydrocarbon resin distributed throughout the elastomer and present in an amount of at least about twenty (20) phr,
wherein the hydrocarbon resin has a predetermined miscibility in the guayule natural rubber at a predetermined concentration of twenty (20) phr of the resin in the elastomer, as measured by a deviation of actual Tg for an elastomer-resin mixture consistent with the elastomer and hydrocarbon resin used in the tire tread composition from predicted Tg for the elastomer-resin mixture, wherein the predetermined miscibility in the elastomer-resin mixture is less than about six percent (6%) deviation in the actual Tg from the predicted Tg, wherein the hydrocarbon resin has a softening point from 110° C. to 165° C., and
wherein the hydrocarbon resin is selected from a group of hydrocarbon resins consisting of cycloaliphatic hydrocarbon resins, aliphatic hydrocarbon resins, polymerized alpha-pinene resins, polymerized beta-pinene resins, and hydrocarbon resins produced by thermal polymerization of mixed dicyclopentadiene (DCPD) and aromatic styrenic monomers derived from petroleum feedstocks, and combinations thereof, and the hydrocarbon resin does not include a coumarone-indene resin, a phenolic resin, or an alpha-methylstyrene resin.

2. The tire tread composition of claim 1, the elastomer consisting of the guayule natural rubber.

3. The tire tread composition of claim 1, wherein the actual Tg of the elastomer-resin mixture is from about −80° C. to about −15° C.

4. The tire tread composition of claim 1, wherein the actual Tg of the tire tread composition is between about −50° C. and −5° C.

5. The tire tread composition of claim 1, wherein the tire tread composition contains no natural plasticizers.

6. The tire tread composition of claim 1, wherein the elastomer-resin mixture contains no fillers and plasticizers.

7. The tire tread composition of claim 1, wherein the predetermined miscibility is calculated by a mathematical model for the elastomer-resin mixture.

8. The tire tread composition of claim 7, wherein the mathematical model includes the Fox equation.

9. A tire tread manufactured with the tire tread composition according to claim 1.

10. A tire comprising a tire tread manufactured with the tire tread composition according to claim 1.

11. A tire tread composition, comprising:
a quantity of an elastomer, the elastomer including guayule natural rubber; and
a quantity of a hydrocarbon resin distributed throughout the elastomer and present in an amount of at least about twenty (20) phr,
wherein the hydrocarbon resin has a predetermined miscibility in the guayule natural rubber at a predetermined concentration of twenty (20) phr of the resin in the elastomer, as measured by a deviation of actual Tg for the tire tread composition from predicted Tg for the tire tread composition, wherein the predetermined miscibility in the tire tread composition is less than about six percent (6%) deviation in the actual Tg from the predicted Tg, and
wherein the hydrocarbon resin has a softening point from 110° C. to 165° C., and
wherein the hydrocarbon resin is selected from a group of hydrocarbon resins consisting of cycloaliphatic hydrocarbon resins, aliphatic hydrocarbon resins, polymerized alpha-pinene resins, polymerized beta-pinene resins, and hydrocarbon resins produced by thermal polymerization of mixed dicyclopentadiene (DCPD) and aromatic styrenic monomers derived from petroleum feedstocks, and combinations thereof, and the hydrocarbon resin does not include a coumarone-indene resin, a phenolic resin, or an alpha-methylstyrene resin.

12. The tire tread composition of claim 11, the elastomer consisting of the guayule natural rubber.

13. A tire comprising a tire tread manufactured with the tire tread composition according to claim 11.

* * * * *